(No Model.) 6 Sheets—Sheet 1.
F. H. FOOTE & A. M. DAHL.
TRAVELING CONVEYER.

No. 599,896. Patented Mar. 1, 1898.

(No Model.)    F. H. FOOTE & A. M. DAHL.    6 Sheets—Sheet 2.
TRAVELING CONVEYER.

No. 599,896.    Patented Mar. 1, 1898.

FIG. 2.

Witnesses:
O. W. Graham.
L. M. Bulkley.

Inventors
Fred H. Foote
Adolph M. Dahl
By Chas. A. Bulkley
Attorney (No Model.) 6 Sheets—Sheet 4.

F. H. FOOTE & A. M. DAHL.
TRAVELING CONVEYER.

No. 599,896. Patented Mar. 1, 1898.

Witnesses:
C. W. Graham
L. M. Bulkley Inventors
Fred H. Foote
Adolph M. Dahl
By Chas. C. Bulkley
Attorney (No Model.) 6 Sheets—Sheet 5.

F. H. FOOTE & A. M. DAHL.
TRAVELING CONVEYER.

No. 599,896. Patented Mar. 1, 1898.

Witnesses:
C. W. Graham
L. M. Bulkley

Inventors
Fred H. Foote
Adolph M. Dahl
By Chas. C. Bulkley
Attorney (No Model.) 6 Sheets—Sheet 6.

F. H. FOOTE & A. M. DAHL.
TRAVELING CONVEYER.

No. 599,896. Patented Mar. 1, 1898.

Witnesses:
C. W. Graham
L. M. Bulkley

Inventors
Fred H. Foote
Adolph M. Dahl
By Chas. C. Bulkley
Attorney

UNITED STATES PATENT OFFICE.

FREDERICK H. FOOTE AND ADOLPH M. DAHL, OF CHICAGO, ILLINOIS.

TRAVELING CONVEYER.

SPECIFICATION forming part of Letters Patent No. 599,896, dated March 1, 1898.

Application filed June 3, 1895. Serial No. 551,478. (No model.)

*To all whom it may concern:*

Be it known that we, FREDERICK H. FOOTE and ADOLPH M. DAHL, citizens of the United States, residing at Chicago, in the county of Cook and State of Illinois, have invented certain new and useful Improvements in Traveling Conveyers, of which the following is a specification, reference being had therein to the accompanying drawings.

Our invention relates to certain improvements in that class of apparatus employed to elevate, convey, and deposit material.

The machine hereinafter described is designed to be employed more particularly for the purpose of picking up and transporting any kind of materials and is adapted and at present used to pick up and transport the coal, ore, limestone, and other materials used in blast-furnaces, although it will be evident that the machine may be used for other purposes.

Our invention has for its object the provision of a machine or an apparatus for initially collecting or receiving material which is assembled in a mass or body, conveying said material to a suitable point of discharge, and delivering the same at the desired point, the arrangement, construction, and character of the machine being such as to provide that desirable and essential universality of movement whereby the foregoing results may be accomplished in a convenient and expeditious manner, and also in combining therewith means by which the machine or apparatus may be guided from a convenient point upon the machine and also propelled thereby in order to effect the desired results automatically or approximately automatically.

Our invention has certain other objects in view; and it consists in certain features, arrangements, combinations, and subcombinations hereinafter to be described, and pointed out in our claims, reference being now had to the accompanying drawings, in which—

We will first proceed with a description of the machine and its parts generally considered, after which the subcombinations by which the various results are accomplished will be described in detail.

The supporting main platform of the machine, upon which the operated and operating parts are mounted, is designated at 30, which platform in turn is mounted upon the supporting-wheels 31 and the traction-wheels 32. Projected from one side of the main platform 30 is the operator's platform-stand 33.

Mounted upon the main platform 30 is the prime mover of or driver for the conveyer and also for the carriage, consisting, as shown in this instance, of a steam-engine comprising the boiler 34 and the engine proper, 35. Rotatably mounted upon the platform is a vertical pedestal 36, supporting the conveyer 37, pivoted at 38 to the pedestal in such a manner as to have a vertical swinging adjustment thereon, the lower or receiving end of the conveyer being mounted upon the supporting-wheels 39. To the upper or discharging end of the conveyer the discharge-spout 40 is secured, held in position by the rod 41.

It is designed to provide means whereby from one point of operation the engine may be brought into action to either propel the carriage and conveyer mounted thereon from point to point or to direct and control the movement of the carriage or to cause the conveyer to swing upon its axis in a horizontal plane or to raise and lower the conveyer vertically or to effect those desirable and comparatively minute movements of the carriage necessary to adjust the position of the conveyer relatively to the mass to be received and conveyed, the mechanism for accomplishing this latter result being interchangeably brought into operation with the mechanism for driving the carriage from point to point. We will now proceed in order with a description of the means by which these results are accomplished, having reference first to transmitting connections between the traction-wheels 32 and the engine.

The engine-shaft 42 has a spur gear-wheel 43 fixed thereon, which meshes with a gear-wheel 44, fixed upon the main shaft 45, a sprocket-wheel 46, loose on the main shaft 45, and a sprocket-chain 47, passing about the larger sprocket-wheel 48, mounted on the axle 49 of the traction-wheels 32, serving to transmit the movement of the main shaft 45 to the said traction-wheels, and thereby propel the conveyer apparatus from point to point.

Figure 3:
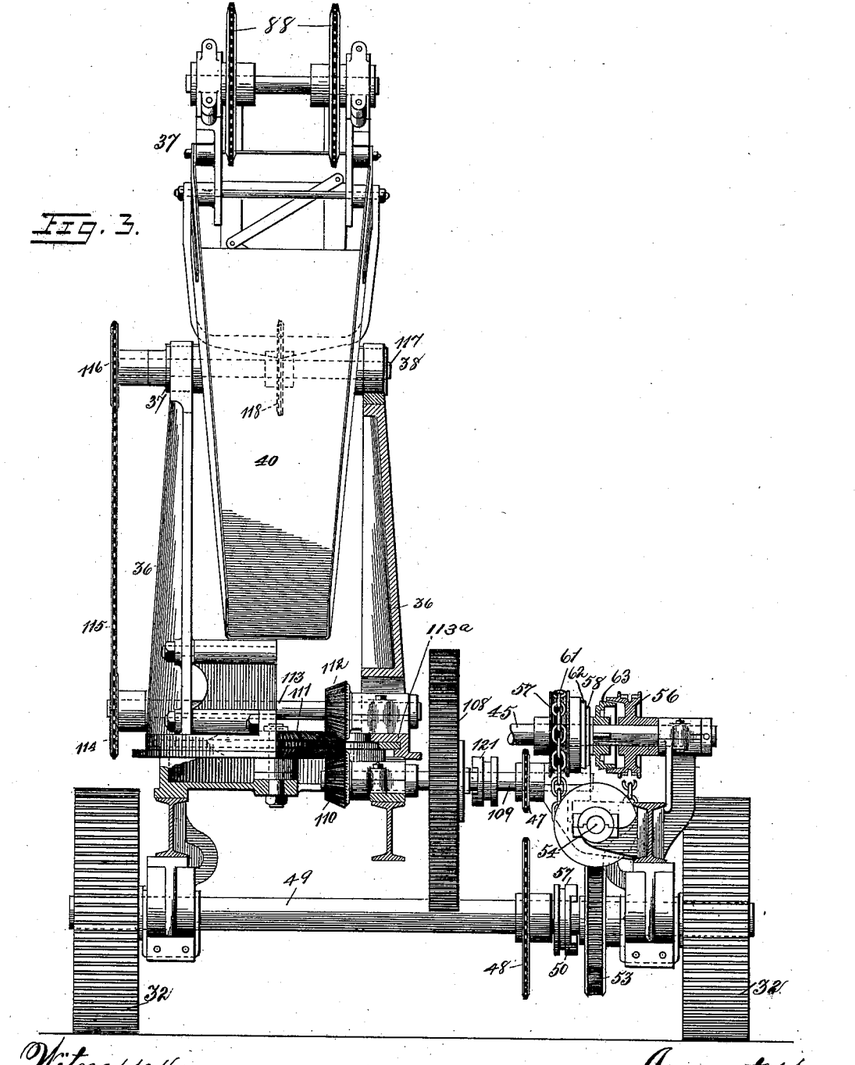
Fig. 3 is a sectional view on the line *x x* of Fig. 2.
Figure 4:
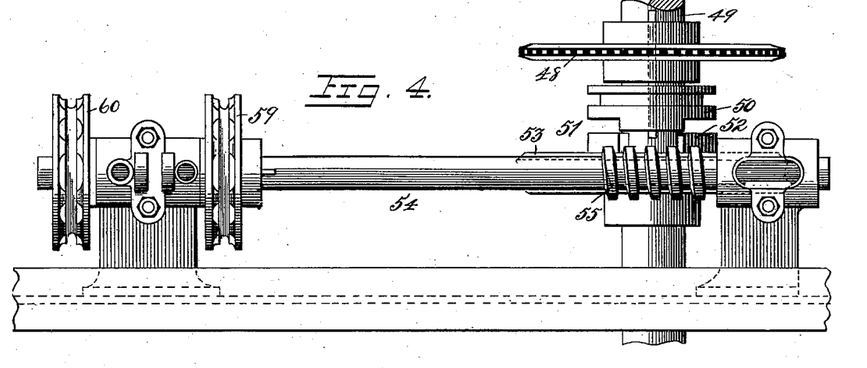
Fig. 4 is an enlarged detail plan view of the mechanism by which those movements of the carrier are effected in order to adjust the same with nicety in relation to the pile or mass of material.
Figures 5, 6:
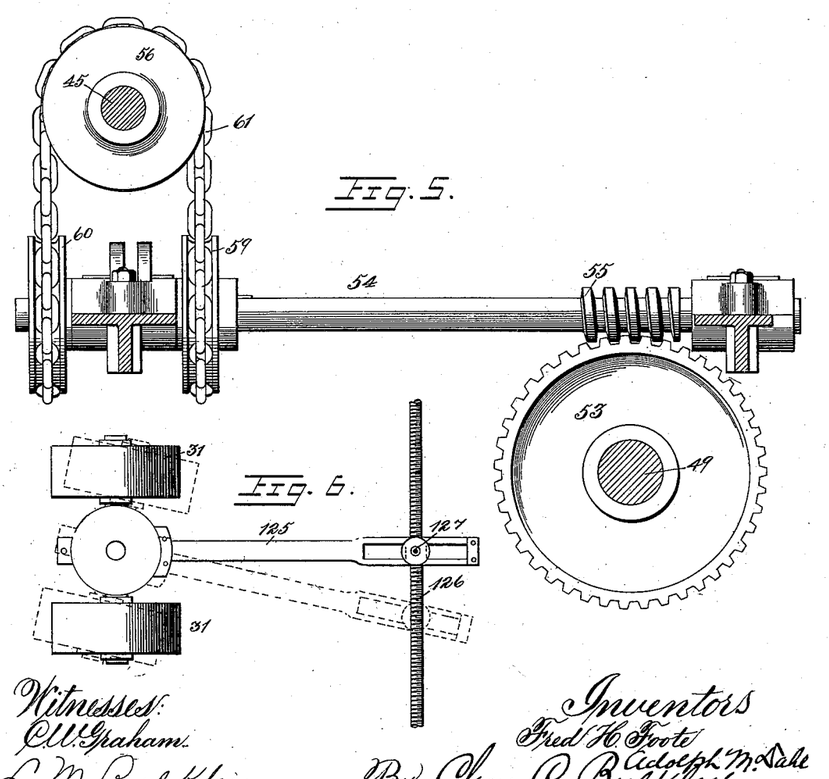
Fig. 5 is a side view of this mechanism.
Fig. 6 is a detail plan view of the steering mechanism.
Figure 7:
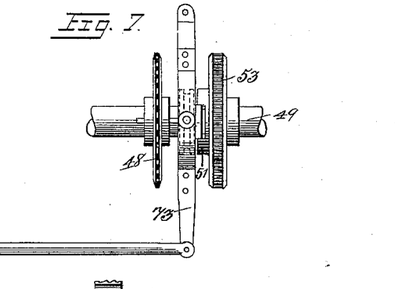
Fig. 7 is a detail view of the connections between the operator's lever and that clutch which engages the mechanism whereby adjustments of the carrier are effected.
Figure 8:
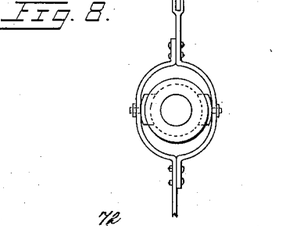
Fig. 8 is a detail view showing the manner of connection between the clutches and the clutch-levers.

In order that the lower end of the conveyer 37 may be adjusted with nicety in relation to the mass of material, we provide means by which the ordinary traction driving or transmitting mechanism may be disengaged and adjusting mechanism engaged, as follows:

Referring to Figs. 4 and 5, it will be seen that the sprocket-wheel 48 is fixed on the axle 49, and the laterally-slidable member 50 of the clutch 51 is adapted to engage the fixed member 52, secured to the side of the worm-wheel 53, which latter is mounted loosely upon the axle 49. Disposed at an angle relative to and above the axle 49 is a worm-shaft 54, carrying the worm 55, meshing with the worm-wheel 53. The worm-shaft 54 is driven in either of opposite directions by means of clutch mechanism, to be described, through the transmitting apparatus, consisting of the sprocket-wheel 56, loosely mounted upon the main shaft 45, Figs. 2 and 3, and the sprocket-wheel 57, also likewise mounted loosely upon said main shaft 45. Located between the sprocket-wheels 56 and 57 is the laterally-movable clutch member 58, adapted to frictionally engage either one of the wheels 56 or 57 and rotate the same. Fixed upon the worm-shaft 54 are the two sprocket-wheels 59 and 60, and the endless sprocket-chain 61 is looped about all four wheels 56, 57, 59, and 60, Figs. 3 and 5. This clutch member 58, consisting of the two bevel parts 62 and 63, Fig. 3, is operated from the operator's platform 32 by means of the lever 64, the connecting-rod 65, and the pivoted clutch-lever 66. The clutch 67 on the main shaft 45 is adapted to engage the sprocket 46 thereon, which transmits movement to the traction shaft or axle 49, and this clutch is operated from the operator's platform 33 by the lever 68, connecting-rod 69, Fig. 11, and pivoted clutch-lever 70.

In Figs. 7 to 10 we have shown the manner in which all of the clutch-levers are connected to their respective clutches, except that in some instances only half of the loop of the clutch-lever is utilized. The clutch 51, which is adapted to engage and couple the worm-wheel 53 to the traction-axle 49, is operated from the operator's stand 33 by the operator's lever 71, the connecting-rod 72, and clutch-lever 73, Fig. 7.

From the foregoing description it will be observed that in order to propel the machine forward the operator from his position at 33 causes an engagement of the clutch 67 with the sprocket-wheel 46, thereby transmitting the rotation of the main shaft 45 to the traction-axle 49, as the sprocket-wheel 48 is rigidly fixed thereon.

The machine may be caused to move backward or forward with delicate and comparatively minute movements in order to effect an adjustment by the operator from the stand 33, causing the clutch 51 to engage the worm-wheel 53 and thereby lock the latter to the traction-axle 49, and then also causing the clutch 58, slidable upon the main shaft 45, to engage either the sprocket-wheel 56 or the sprocket-wheel 57, in the one case causing the worm-shaft 54 and worm 55 to rotate in one given direction and thereby rotate the worm-wheel 53 and traction-axle 49 in one direction, and in the other case causing the said shaft 54, worm 55, worm-wheel 53, and axle 49 to rotate in a contrary direction, and thus either move the machine forward or backward, as desired.

It is evident that before the worm transmitting mechanism can be employed it is necessary from the operator's stand 33 to disengage the mechanism directly transmitting the movement of the main shaft 45 to the traction-axle 49 by disengaging the clutch 67 from the sprocket-wheel 46. It is now apparent that we provide two independent sets of transmitting mechanism whereby the rotation of the main shaft 45 is communicated to the traction-axle 49 for the accomplishment of those desired ends hereinbefore set forth.

Figures 9, 10, 11, 12, 13:
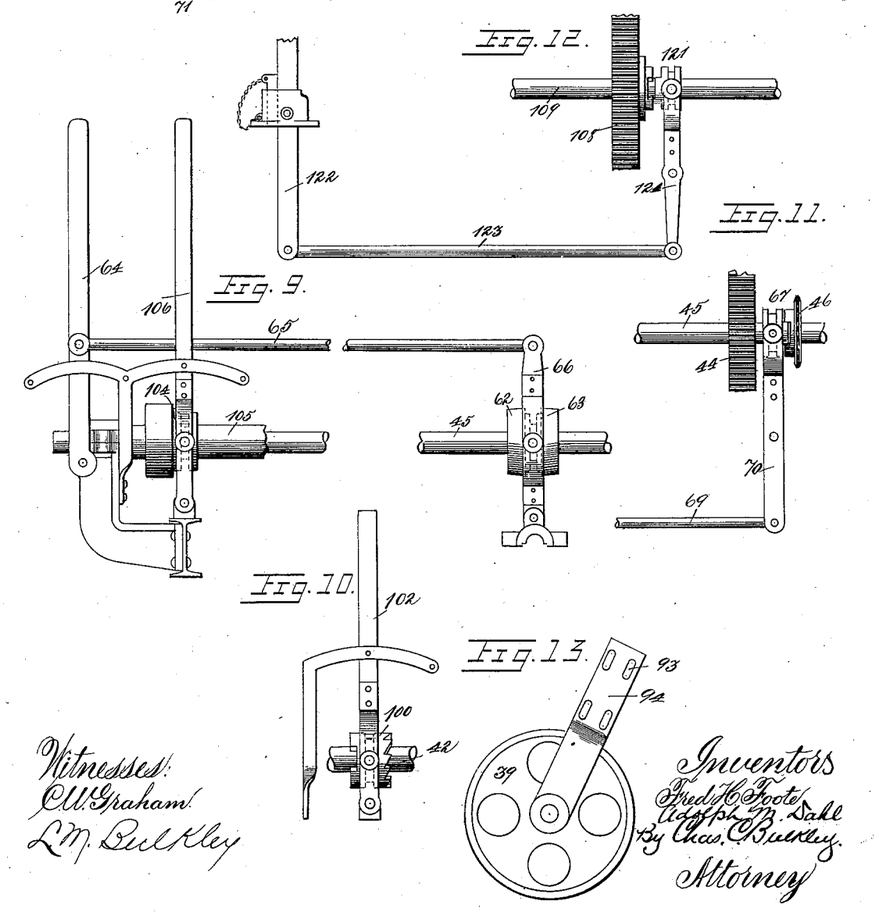
Fig. 9 is a view similar to Fig. 7, showing the operator's levers and connections by which the movements of the carrier are effected in opposite directions, this view also showing the clutch mechanism and connection for rotating the pedestal to swing the carrier laterally.
Fig. 10 is a like view showing the clutch mechanism and connections for operating the means for adjusting the upper end of the conveyer or for engaging the steering mechanism.
Fig. 11 is a like view showing the clutch and connections for locking the direct connection with the traction-axle.
Fig. 12 is a like view showing the clutch mechanism and connections for connecting the driving mechanism with the endless carrier.
Fig. 13 is a detail view of the conveyer-supporting wheels and holding-bar therefor.
Figure 14:
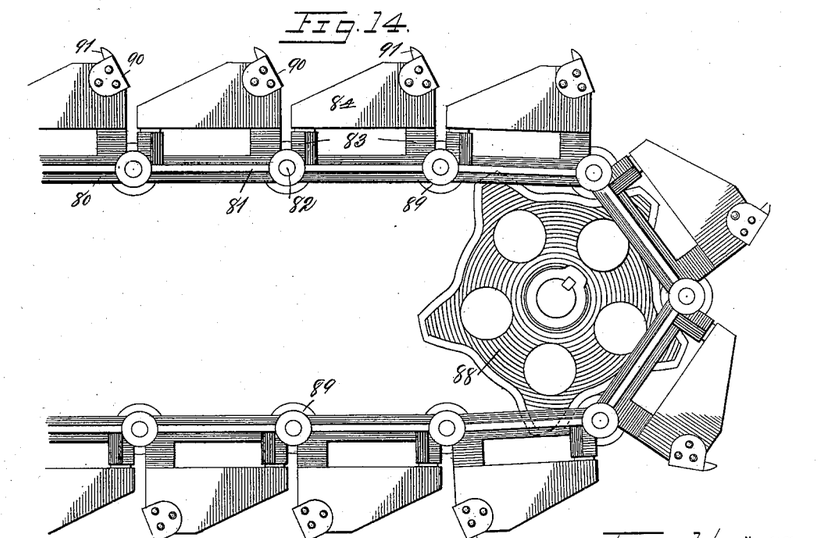
Fig. 14 is an enlarged detail side view of the carrier.
Figure 15:
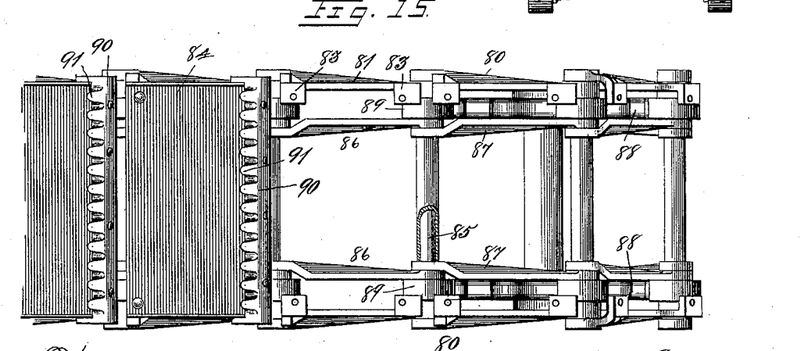
Fig. 15 is a plan view of the same.
Figure 16:
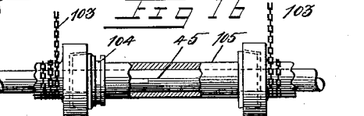
Fig. 16 is a detail of the shaft 145 and contiguous parts.

We will now refer to the construction and arrangement of the conveyer 37, as shown in Figs. 13, 14, and 15. The endless chain (designated as a whole at 80) consists of links 81, pivoted together at 82 and having projected seats 83 for the buckets 84, these buckets being bolted securely in place upon the chain-carried seats 83. The two chains 80 are connected together by means of the tie-bars 85, and these tie-bars are also in turn connected together by means of chains 86, consisting of the connecting-links 87, arranged to grasp the tie-bars 85, as shown in Fig. 15. The endless chains 80 and the buckets 84, carried thereby at each end of the conveyer 37, pass about the sprocket-wheels 88, the sprockets of which, entering between the conveyer-chains 80 and the stay-chains 87, engage against the antifriction-roller 89, mounted upon the tie-bars 85 between said chains. The buckets 84 have secured to their collecting edges the collectors 90, consisting of the teeth 91, providing a serrated engaging edge. The tension of the conveyer-chains 80 is maintained by means of the adjusting-screws 92, as shown in Fig. 1.

In order to adjust the height of the conveyer-buckets relative to the ground-line as they pass about the lower end of the conveyer, we provide the slots 93, Fig. 13, in the holding-bar 94 of the supporting-wheel 39, so that by loosening the bolts 95 the lower end of the conveyer may be raised or lowered and thus adjusted. This result, it is evident, may be accomplished by adjusting the end of the conveyer relative to the holding-bar 94 at any desired point longitudinally thereof and then securing the bolts 95 and holding the conveyer end in this adjusted position.

Figure 1:
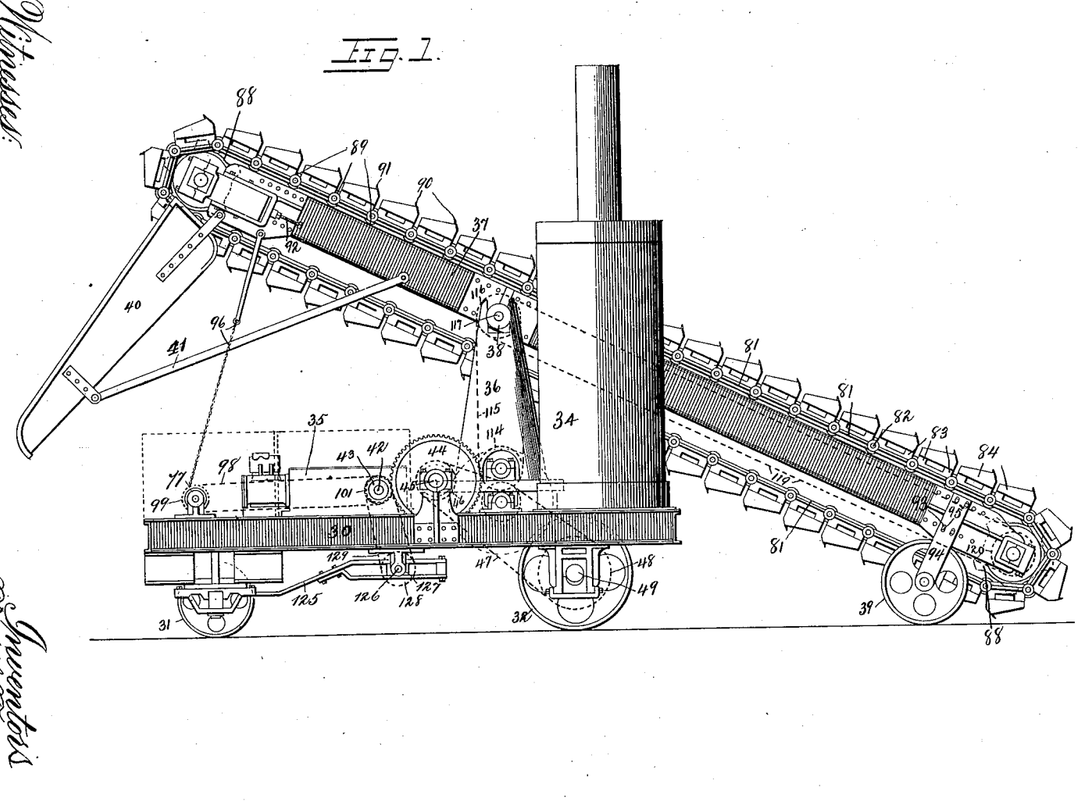
Figure 1 is a side elevation of the complete machine.
Figure 2:
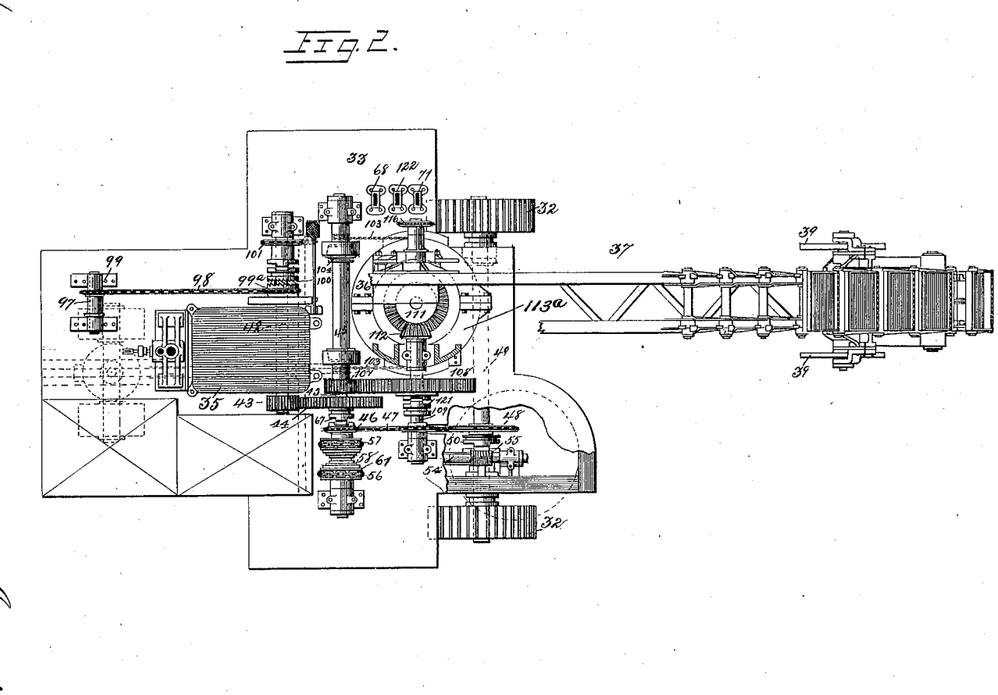
Fig. 2 is a plan view of the same.

As shown in Fig. 1, we provide the pulling-chain 96 for adjusting the conveyer vertically, connected to the upper end of the conveyer and wound about the drum 97 at the rear end of the machine, which drum is connected by the sprocket-chain 98, passing about the sprocket-wheel 99, Fig. 2, and also the sprocket-wheel 99$^a$, with the engine-shaft 42, sprocket-wheel 99$^a$ being loosely mounted upon the engine-shaft 42 and carrying the fixed member of the clutch 100, the movable member of which secures the wheel 99$^a$ to the engine-shaft 42, thus rotating the drum 97 and winding up the pulling-chain 96 and raising the lower end of the conveyer, the depression of the lower end being effected by gravity. Also mounted upon the engine-shaft 42 is a sprocket-wheel 101, which operates the steering-gear to be described, the clutch 100 being interchangeably employed for locking this sprocket-wheel 101 to the engine-shaft 42 or, as described, to lock the sprocket-wheel 99$^a$ to the shaft. The operator's lever 102, Fig. 10, operates the clutch 100.

Referring now to the mechanism by which the pivoted pedestal 36 is rotated in order to laterally swing the conveyer 37, Fig. 2, an operating-chain 103 is passed about the periphery of the base or turn-table of the pedestal 36. The two ends of the chain 113 are each secured to the drums 105 105$^a$, loosely mounted on the shaft 45. Each of these drums carries an internal friction-collar 105$^b$, facing a sleeve 105$^d$, which is keyed to rotate with the shaft 45 between the two drums, but is permitted a longitudinal movement along said shaft. This sleeve carries at each end a friction-cone 105$^f$, adapted to engage the hollow friction-collars of the drums. By sliding the sleeve in either direction along the shaft 45 one or other of the drums is made to revolve with the shaft, winding up one or the other end of the chain 103 and turning the pedestal, with the conveyer, in the required direction. The drum 105 is held from movement on the shaft by bearing against the bearing for the shaft 45, and the drum 105$^a$ likewise bears against the hub of the pinion 107.

Referring now to the mechanism for driving the endless carrier and buckets thereon, (shown more clearly in Figs. 1 and 2,) the spur gear-wheel 107, mounted on the main shaft 45, meshes with the larger gear-wheel 108, mounted on the counter-shaft 109, on the end of which latter is a bevel gear-wheel 110, meshing with the under side of a horizontally-disposed double idler gear-wheel 111, with the upper side of which a bevel gear-wheel 112 meshes, the latter being fixed upon the carrier drive-shaft 113, having secured thereon a sprocket-wheel 114, connected by the sprocket-chain 115 to a sprocket-wheel 116, mounted upon the carrier drive-shaft 117, journaled in the upper end of the pedestal 36. Also mounted upon the pedestal-shaft 117 and located intermediately between the carrier-chains 80 is a sprocket-wheel 118, connected by the chain 119, Fig. 3, with the carrier drive sprocket-wheel 120, located at the lower end of the conveyer. The gear-wheel 108 is mounted loosely upon the counter-shaft 109 and adapted to be locked thereto by means of the clutch 121, which is operated by means of the lever 122, Fig. 12, connecting-rod 123, and pivoted clutch-lever 124.

The intermediate mechanism, comprising the idler double gear-wheel 111 and the meshing bevel gear-wheels 110 and 112, afford means by which the power is transmitted to the conveyer and at the same time permit free movement of the pedestal 36 upon the turn-table 113$^a$ and the assumption of any angular position by the shaft 113, to which the power is communicated.

Referring to the steering mechanism, the steering-wheels 31 are operated by the steering-rod 125, Fig. 6, the end of which is connected to the worm-shaft 126 by means of the screw-threaded box 127, and this worm or screw shaft 126 therefore meshes with the threads of the box 127, and thus the steering-lever 125 is moved laterally in the rotation of the screw-shaft 126. This screw-shaft has fixed thereto a sprocket-wheel 128, Fig. 1, connected by the sprocket-chain 129 with the sprocket-wheel 101, and movements of rotation in two different directions are imparted to this screw-shaft 126 by means of the clutch 100, Fig. 2, which clutch, as previously stated, is also utilized to operate the mechanism whereby the upper end of the conveyer is lowered.

As the machine in its forward movement simply rotates the worm-shaft 126 of the steering mechanism in one direction, it is necessary in order to change the direction of movement of the machine to disconnect the driving mechanism thereof and then reverse the engine, which will operate said worm-shaft in the opposite direction.

Having thus described our invention, what we claim as new therein, and desire to secure by Letters Patent, is—

1. In an elevating and conveying device the combination with a suitable supporting-carriage of a conveyer pivotally mounted thereon having endless carriers with conveyer-buckets attached, a prime mover upon said carriage furnishing power for the various movements required, mechanism for causing a horizontal movement of the conveyer upon its pivot, manually-operated connections between this mechanism and the prime mover whereby the latter is brought into operation to effect a horizontal movement of the conveyer, vertically-adjusting mechanism connected with the conveyer, connections manually operated to cause the prime mover to effect this adjustment, means for guiding the carriage and connections whereby the prime mover is brought into operation manually to operate the guiding mechanism.

2. In an elevating and conveying device the combination with a suitable supporting-carriage of a conveyer pivotally mounted thereon having endless carriers with conveyer-buckets attached, a prime mover upon said carriage furnishing power for the various movements required, mechanism for causing a horizontal movement of the conveyer upon its pivot, manually-operated connections between this mechanism and the prime mover whereby the latter is brought into operation to effect a horizontal movement of the conveyer, vertically-adjusting mechanism connected with the conveyer, connections manually operated to cause the prime mover to effect this adjustment, means for guiding the carriage and connections whereby the prime mover is brought into operation manually to operate the guiding mechanism together with traction-wheels, driving mechanism therefor between the prime mover and the traction-wheels and manually-operated connections for bringing the prime mover into operation to drive the traction-wheels.

3. In an elevating and conveying device the combination with a suitable supporting-carriage of a conveyer pivotally mounted thereon, a prime mover upon said carriage furnishing power for the various movements required, traction-wheels for the carriage, driving mechanism therefor between the prime mover and the traction-wheels and mechanism adapted to be driven by the prime mover capable of moving the carriage backward and effecting comparatively minute adjustments of the conveyer, manually-operated devices and connections for interchangeably bringing either the direct-acting driving mechanism into operation upon the traction-wheels or the adjusting mechanism into operation upon the traction-wheels.

4. In an elevating and conveying device the combination with a suitable supporting-carriage of a conveyer pivotally mounted thereon having endless carriers with conveyer-buckets attached, a prime mover upon said carriage furnishing power for the various movements required, traction-wheels for the carriage, driving mechanism therefor between the prime mover and the traction-wheels and mechanism adapted to be driven by the prime mover capable of moving the carriage backward and effecting comparatively minute adjustments of the conveyer and manually-operated devices and connections for interchangeably bringing either the direct-acting driving mechanism into operation upon the traction-wheels or the adjusting mechanism into operation upon the traction-wheels, together with guiding mechanism for the carriage and manually-operated connections for causing the prime mover to operate the guiding mechanism.

5. In an elevating and conveying device the combination with a suitable supporting-carriage of a conveyer pivotally mounted thereon, a prime mover upon said carriage furnishing power for the various movements required, traction-wheels for the carriage, driving mechanism therefor between the prime mover and the traction-wheels and mechanism adapted to be driven by the prime mover capable of moving the carriage backward and effecting comparatively minute adjustments of the conveyer, manually-operated devices and connections for interchangeably bringing either the direct-acting driving mechanism into operation upon the traction-wheels or the adjusting mechanism into operation upon the traction-wheels and guiding mechanism for the carriage operated by the prime mover together with means for horizontally and vertically adjusting the conveyer by the prime mover.

6. In an elevating and conveying device the combination with a suitable supporting-carriage of a conveyer pivotally mounted thereon having endless carriers with conveyer-buckets attached, a prime mover upon said carriage furnishing power for the various movements required, traction-wheels for the carriage, driving mechanism therefor between the prime mover and the traction-wheels and mechanism adapted to be connected therewith for operating the carriage in either direction and effecting minute adjustments together with means for swinging the conveyer horizontally and vertically and manually-operated devices and connections whereby the latter results are effected by the prime mover.

7. In an elevating and conveying device the combination of a conveyer, a supporting-carriage upon which the conveyer is pivotally mounted, a prime mover operating to drive the carriage and interchangeable mechanism arranged in independent sets capable of being brought into operation to drive the carriage and effect backward and comparatively minute adjustments of the conveyer, together with manually-operated devices and connections whereby either one of the aforesaid independent sets is brought into action.

8. In an elevating and conveying apparatus interchangeable devices for driving the carriage supporting the conveyer consisting of the prime mover mounted upon the carriage, transmitting connections between the driven shaft and the traction-wheels and means for bringing the same into operation to propel the carriage said transmitting connections and means constituting one set for propelling the carriage and another set of independent transmitting connections independent of the first-mentioned set between the driven shaft and the traction-wheels for propelling the carriage backward and effecting minute adjustments thereof consisting in connections actuated by the main drive-shaft, a supplemental shaft operatively connected with the axle of the traction-wheels said connections of the main drive-shaft imparting the movement of rotation of the latter to the supplemental shaft and thereby to the traction-wheels together with manually-operated devices and connections whereby the supplemental shaft is caused to rotate in different directions.

9. In an elevating and conveying apparatus means for driving the carriage supporting the conveyer consisting of a prime mover mounted upon the carriage, transmitting connections between the driven shaft and the traction-wheels and means for bringing the same into operation to propel the carriage said transmitting connections constituting one set for propelling the carriage, means for disengaging or disconnecting said set of propelling mechanism and another set of independent transmitting connections independent of the first-mentioned set between the driven shaft and the traction-wheels for moving the carriage in either direction consisting of a transmitting-shaft arranged at an angle relative to the driven shaft transmitting-wheels mounted loosely on the driven shaft and fixedly on the transmitting-shaft, a flexible connector passing about the wheels on the driven shaft and on the transmitting-shaft, and manually-operated clutch mechanism for locking either one of the transmitting-wheels to the driven shaft whereby the transmitting-shaft is caused to rotate in either direction together with connections between the transmitting-shaft and the traction-wheels.

10. In an elevating and conveying apparatus means for driving the carriage supporting the conveyer consisting of a prime mover mounted upon the carriage, transmitting connections between the driven shaft and the traction-wheels and means for bringing the same into operation to propel the carriage said transmitting connections constituting one set for propelling the carriage, means for disengaging or disconnecting said set of propelling mechanism and another set of independent transmitting connections independent of the first-mentioned set between the driven shaft and the traction-wheels for moving the carriage in either direction and for effecting minute adjustments thereof consisting of a transmitting-shaft arranged at an angle relative to the driven shaft, transmitting-wheels mounted loosely on the driven shaft and fixedly on the transmitting-shaft, a flexible connector passing about the wheels on the driven shaft and on the transmitting-shaft and manually-operated clutch mechanism for locking either one of the transmitting-wheels to the driven shaft whereby the transmitting-shaft is caused to rotate in either direction together with worm-gear connections between the transmitting-shaft and the axle of the traction-wheels.

11. In an elevating and conveying apparatus the combination with a pivotally-mounted conveyer of a supporting wheel or wheels located at the receiving end of the conveyer and adjustably secured thereto and adapted to travel upon the ground whereby the receiving end of the conveyer may be movably supported and its distance from the ground determined.

12. In an elevating and conveying apparatus the combination with a pivotally-mounted conveyer, a suitable carriage therefor, means for driving said carriage and conveyer from point to point, a supporting wheel or wheels located at the receiving end of the conveyer and adapted to travel along the ground, a slotted bar or bars for holding the supporting wheel or wheels and securing-bolts passed through the slots of the bar or bars whereby the latter is adjustably held to the conveyer.

13. In a conveying and elevating apparatus the combination of a supporting and traveling carriage, conveyer apparatus mounted thereon, a prime mover, a shaft driven thereby constituting the main shaft, a counter-shaft adjacent to the main shaft, a transmitting connection between said shafts, a rotatable conveyer-supporting pedestal, carriers having buckets attached movably mounted in the conveyer, carrier drive-shafts journaled in the upper and lower portions of the pedestal, a flexible connector between said carrier drive-shafts and intermediate transmitting connections between the counter-shaft and the lower one of the carrier drive-shafts together with a flexible connector between the upper one of the carrier drive-shafts and the conveyer-carrier.

14. In an elevating and conveying apparatus the combination of the conveyer mounted upon a carriage adapted to be propelled, and having an endless carrier, a pedestal to the upper portion of which the conveyer is pivoted, carrier drive-shafts journaled in the upper and lower portions of the pedestal, connections between said drive-shafts and the conveyer, a turn-table upon which the pedestal is mounted, a prime mover mounted on the carriage and transmitting connections between the prime mover and the carrier drive-shafts.

15. In an elevating and conveying apparatus the combination of the conveyer mounted upon a carriage adapted to be propelled, and having an endless carrier, a pedestal to the upper portion of which the conveyer is pivoted, carrier drive-shafts journaled in the upper and lower portions of the pedestal connections, between said drive-shafts and the conveyer, a turn-table upon which the pedestal is mounted, a prime mover mounted on the carriage and transmitting connections between the prime mover and the carrier drive-shafts together with clutch mechanism for locking the said transmitting connections.

16. In an elevating and conveying apparatus a traveling carriage, a prime mover mounted thereon, a pedestal also mounted on said carriage pivotally by means of a turn-table, a conveyer pivotally mounted on the upper end of the pedestal and having a carrier movable in said conveyer and carrier drive-shafts mounted in the pedestal together with means for transmitting the movement of the prime mover to the carrier drive-shafts.

17. In an elevating and conveying apparatus the combination of a traveling carriage, a prime mover mounted thereon, a pedestal also pivotally mounted on the carriage, having an endless carrier pivotally mounted on the pedestal, means for rotating the pedestal to horizontally adjust the conveyer by the prime mover, carrier drive-shafts mounted in the pedestal and transmitting connections between the prime mover and the drive-shafts.

18. In an elevating and conveying apparatus the combination of a carriage adapted to be driven from point to point, a pedestal pivotally mounted thereon, a conveyer, having an endless carrier with buckets thereon, pivotally mounted on the pedestal, driving mechanism and connections for operating the pedestal to swing the conveyer laterally in either direction, and intermediate connections between the driving mechanism and the transmitting mechanism for the endless carrier which intermediate mechanism consists of a double gear-wheel and upper and lower gear-wheels meshing therewith carried respectively by the driving mechanism and the transmitting mechanism aforesaid.

In testimony whereof we affix our signatures in presence of two witnesses.

FREDERICK H. FOOTE.
ADOLPH M. DAHL.

Witnesses:
CHAS. C. BULKLEY,
NETTIE A. FOOTE.